Patented Mar. 18, 1930

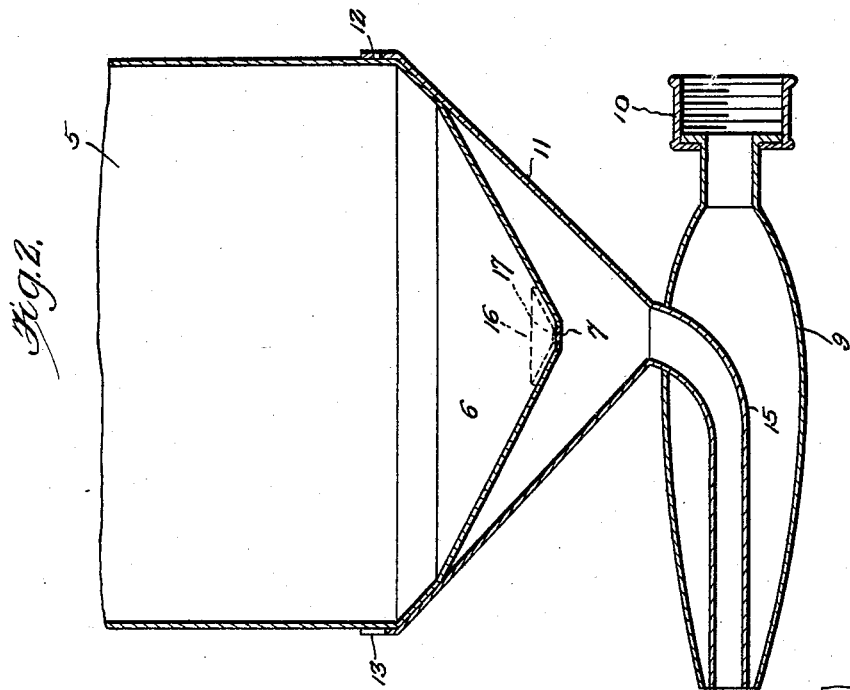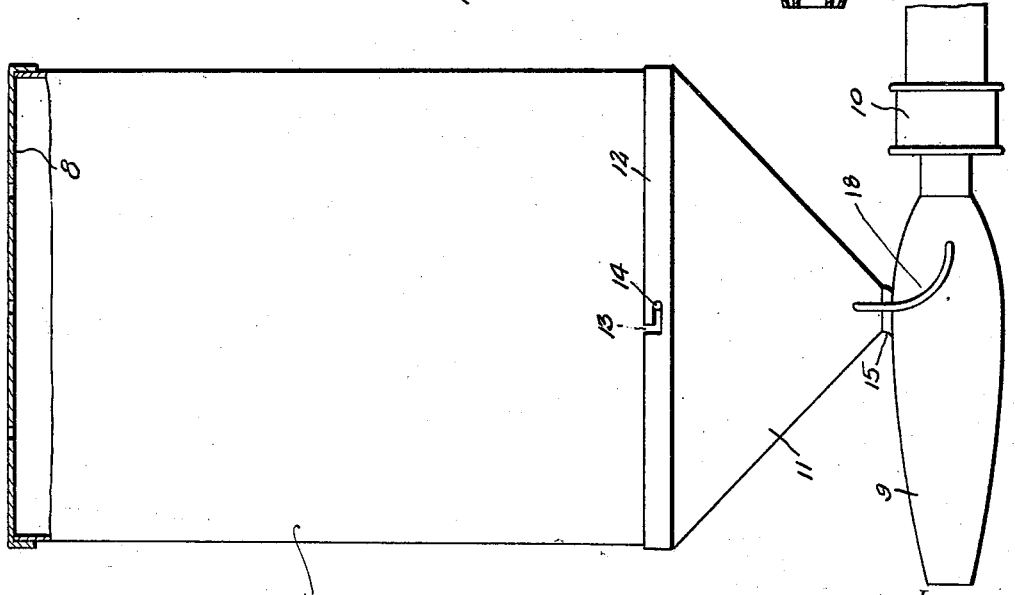

1,751,283

UNITED STATES PATENT OFFICE

ASA E. LOWE, OF SEATTLE, WASHINGTON

PULVERIZED-FERTILIZER NOZZLE SPRAY

Application filed May 5, 1928. Serial No. 275,482.

The present invention relates to pulverized fertilizer nozzle sprays and has for its prime object to provide a device of this nature which affords an equal distribution of the fertilizer, prevents burning of the vegetation, and covers a maximum square feet per pound of fertilizer used and if desired, grass or clover seed may be mixed with the pulverized fertilizer and sowed at the same time.

A still further important object of the invention resides in the provision of a device of this nature which is simple in its construction, inexpensive to manufacture, durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is an elevation of the device embodying the features of my invention, the upper portion thereof being shown in section, and, Figure 2 is a vertical section through the lower portion thereof.

Referring to the drawing in detail it will be seen that the numeral 5 denotes a cylindrical shank having an inverted frusto-conical bottom 6 to provide a central opening 7. A perforated lid 8 is disposed on the upper end of the casing 5. The numeral 9 denotes a nozzle having a coupling 10 at one end. A frusto-conical cap 11 at its larger end is provided with an annular flange 12 having bayonet slots 13 therein to engage pins 14 projecting from the lower portion of the casing 5 to hold the portion 11 over the bottom 6, the upper portion of the bottom 6 is concentric with the portion 11 while the lower portion of the bottom is more angular so as to terminate inwardly of the portion 11. The smaller end of the portion 11 merges into a pipe 15 which is curved and pierces an intermediate portion of the nozzle 9. The pipe 15 terminates contiguous with the mouth of the nozzle 9. The diameter of the pipe 15 is less than the diameter of the mouth of the nozzle 9. A disc 16 is shaped so as to fit down in the lower portion of the bottom 6 and has an opening 17 at the center thereof. One or more of these discs may be provided so that the opening 7 is effectively made smaller thereby.

It will be seen that when the casing 5 is filled with pulverized fertilizer that the same will gravitate through the opening 7 into the pipe 15 and as the water stream flows through the nozzle 9 about the pipe 15 and out the mouth of the nozzle it will pick up this pulverized fertilizer to mix it thoroughly with the water and to spray it where desired.

A small pipe 18 connects the frusto-conical cap 11 and the nozzle 9 for the purpose of supplying a little water to help siphon the fertilizer out.

It is thought that the construction, utility and advantages of the invention will now be quite apparent to those skilled in this art without a more detailed description thereof. The present embodiment of the invention has been disclosed in detail by way of example since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A device for spraying pulverized fertilizer comprising a hopper for the reception of the fertilizer having an inverted conical shaped bottom wall provided with an axial outlet feed opening, means for varying the effective size of the opening, an inverted feed cone receiving the bottom wall and detachably connected with the hopper having an axial outlet opening therein, the feed cone being of greater slope than the bottom wall to space the outlet opening from the feed opening, a water inlet pipe extending between the bottom wall of the hopper and the feed cone, a nozzle extending at right angles to the vertical axis of the hopper, and an outlet pipe communicating with the axial outlet opening of the feed cone and extending into said nozzle and terminating in the same plane and concentric with the mouth of the nozzle.

In testimony whereof I affix my signature.

ASA E. LOWE.